United States Patent [19]

Wagner et al.

[11] Patent Number: 4,591,534
[45] Date of Patent: May 27, 1986

[54] WALL STRUCTURE FOR ROCKET NOZZLE EXTENSION

[75] Inventors: William R. Wagner, Los Angeles; Robert A. Feight, Canoga Park, both of Calif.

[73] Assignee: Rockwell International Corporation, El Segundo, Calif.

[21] Appl. No.: 643,608

[22] Filed: Aug. 23, 1984

[51] Int. Cl.⁴ .............................................. B64D 33/04
[52] U.S. Cl. ............................... 428/593; 239/265.11; 428/598; 428/604; 428/674
[58] Field of Search ............... 428/593, 598, 604, 674; 239/265.11, 265.19; 181/216

[56] References Cited

U.S. PATENT DOCUMENTS 2,940,557  6/1960  Herbert, Jr. ..................... 428/593
4,144,632  3/1979  Stroupe ............................ 29/469.5

Primary Examiner—Melvyn J. Andrews
Attorney, Agent, or Firm—H. Fredrick Hamann; Harry B. Field; Lawrence N. Ginsberg

[57] ABSTRACT

An improved structural material for the wall of a rocket engine nozzle extension comprising a thin sheet-metal base 12 and a rib wall 16 comprising a grid of intersecting ribs 18 which form internal cavities 20. A surface of the base 12 is plated 14 with Cu and the rib wall 16 is bonded thereto so that each cavity 20 has an open end. The interior surfaces of the ribs 18, which form the cavities 20, are also plated with Cu.

9 Claims, 1 Drawing Figure

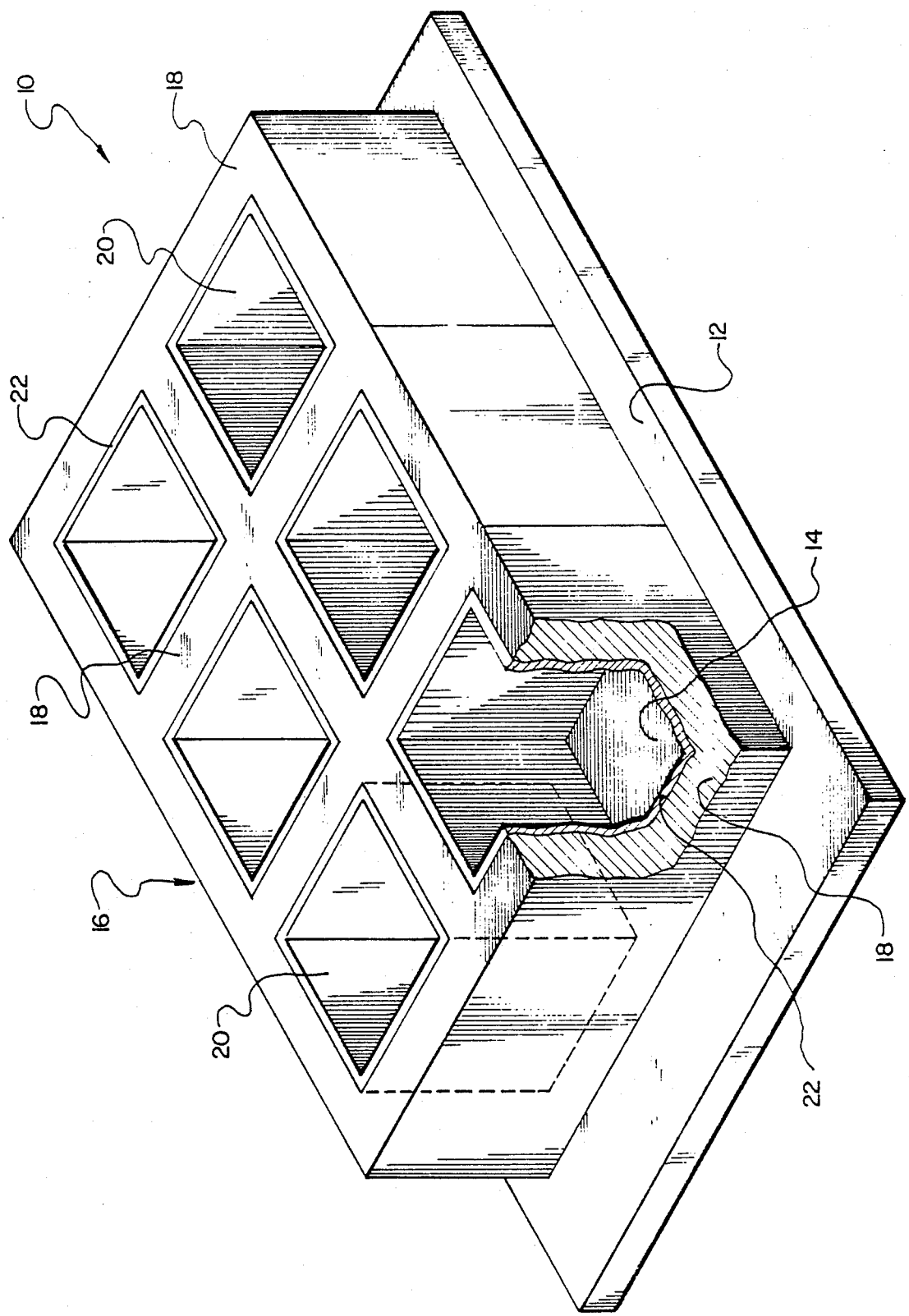

WALL STRUCTURE FOR ROCKET NOZZLE EXTENSION

BACKGROUND OF THE INVENTION

1. Field of the Invention

This invention relates to rocket-engine nozzle extensions and especially to wall structures for increasing the strength and thermal-radiation capability of rocket-engine nozzle extensions.

2. Description of the Prior Art

Many rocket engines are made with nozzle extensions, so that the engine length may be decreased for storage by retracting the nozzle extension and may be increased to its full length by extending the nozzle extension section. The nozzle extension provides the engine with greater thrust.

Nozzle extensions are generally formed from sheet metal, such as Ti, stainless steel, columbium, etc.. The thin sheet metal is subject to vibration problems which can shatter the nozzle extension. Various expedients, such as circumferential thickening ribs known as hatbands, have been employed to increase structural stiffness, but other problems arise. The thermal conductivity of the ribs is different from that of the intermediate sheet metal areas and they expand at different rates, resulting in a warping of the shape of the nozzle extension.

OBJECTS OF THE INVENTION

An object of the invention is to increase the structural strength of the walls of a nozzle extension for a rocket engine.

Another object is to improve the thermal radiation capability of the walls of a nozzle extension for a rocket engine.

Other objects, advantages and novel features of the present invention will become apparent from the following detailed description of the invention when considered in conjunction with the accompanying drawing.

SUMMARY OF THE INVENTION

The invention is an improved structure for the wall of a rocket-engine nozzle extension comprising a rib wall section bonded to a thin sheet-metal base. A surface of the base is plated with a metal having good thermal conductivity and a high melting point. The rib wall is bonded to the base surface. The rib wall comprises ribs of metal forming a grid which encloses a group of internal cavities. The walls of the internal cavities are also plated with a material having good thermal conductivity and a high melting point. The composite wall structure exhibits greater stiffness and greater heat radiative capability than the usual sheet metal from which nozzle extensions are built, provides greater resistance to vibrational damage, and permits the nozzle extension to operate at lower temperatures.

BRIEF DESCRIPTION OF THE FIGURE

The single FIGURE shows a section of the wall structure of an embodiment of the present invention.

DETAILED DESCRIPTION OF THE INVENTION

The invention comprises a wall structure 10, a portion of which is illustrated in the FIGURE. The wall structure 10 comprises a flat base 12 which may be fabricated from a usual metal for a nozzle extension, such as inconel, incalloy, stainless steel, hastelloy, titanium, etc.. Instead of the conventional thickness of about 0.030", the thickness can be reduced to about 0.005", for example.

The base 12 is coated by any suitable process with a thermally radiative plating 14 of about 0.002", for example. Copper is preferred, although any metal, such as Ni, with good thermal conductivity (e.g., approximately 40 BTU/hour/foot/°F. or higher) and a high melting point (above about 1500° F.) may be used. A rib wall section 16 is bonded to the copper plating 14. The ribs 18 may be of a structural material such as Ti, stainless steel, graphite, etc., and about 0.0025" thick, for example. The ribs 18 are configured in a grid so that they enclose cavities 20 reaching down to the copper plating 14 on the base 12 and open at the other end. These ribs 18 are bonded to or integral with base 12. The interior walls of the cavities 20 are also coated with a plating 22 of a good thermally conductive material, such as copper. The plating material should also have a good radiation emissivity characteristic, i.e., in the range of 0.7 to 0.95. Oxidized copper will exhibit a value within this range.

The ribs could be formed from a metal plate of about 0.2–0.5" in thickness by electro-discharge machining or electro-chemical etching or single sheet honeycomb material, for example. If the cavities 20 are square in the area, the height-to-width ratio should be approximately between 1 and 2. If the height is too small, the rib wall will not provide sufficient stiffening and if the height is too deep, the radiation capability will drop. The transverse cross-section of the cavities 20 can have other shapes, e.g., hexagonal or rectangular, as long as the dimensions provide good radiative and structural characteristics.

The wall structure described provides increased structural strength and stiffness for the wall of a rocket nozzle extension and provides excellent thermal radiation, permitting the nozzle extension to run cooler during operation of the engine. Cooler operation also improves the thermal fatigue characteristics of the nozzle extension.

The invention would also be useful with refractory metal bases (e.g., Mo, Co, Ta, W) at very high operating temperatures).

Obviously, many modifications and variations in the present invention are possible in light of the above teachings. It is therefore to be understood that, within the scope of the appended claims, the invention may be practiced otherwise than as specifically described.

What is claimed and desired to be secured by Letters Patent of the United States is:

1. A rocket-engine nozzle extension having an improved wall structure of increased structural strength and thermal radiation capability, said wall structure comprising:

a base of sheet metal;

a plating on one surface of said base, said plating being formed of a material having good thermal conductivity and a high melting point so as to improve the radiation capability of said surface;

a rib wall comprising intersecting ribs forming a grid structure having internal cavities, said rib wall being set upon and bonded to the plated surface of said base so that each cavity is open at one end; and a plating on the internal surfaces of the ribs which form each cavity, said plating being formed of a material having good thermal conductivity, a high melting point, and a good radiation emissivity characteristic so that the rib wall provides increased structural strength and stiffness for the wall structure and said plating provides excellent thermal radiation, thereby permitting said nozzle extension to operate at lower temperatures.

2. The rocket-engine nozzle extension as in claim 1, wherein:
the plating materials are copper.

3. The rocket-engine nozzle extension as in claim 1, wherein:
said base is roughly about 0.005" in thickness.

4. The rocket-engine nozzle extension as in claim 1, wherein:
said platings are about 0.002" in thickness.

5. The rocket-engine nozzle extension as in claim 1, wherein:
said ribs are about 0.0025" in thickness.

6. The rocket-engine nozzle extension as in claim 1, wherein:
the height of said ribs above said base is in the approximate range of 0.2–0.5".

7. The rocket-engine nozzle extension as in claim 6, wherein:
said ribs are about 0.0025" in thickness.

8. The rocket-engine nozzle extension as in claim 7, wherein:
said base is roughly 0.005" in thickness.

9. The rocket-engine nozzle extension as in claim 8, wherein:
said platings are about 0.002" in thickness.

* * * * *